May 5, 1970  J. E. LINDBERG  3,509,942
SYSTEM FOR DETECTING STRUCTURAL FAILURE
Filed Aug. 15, 1966  3 Sheets-Sheet 1
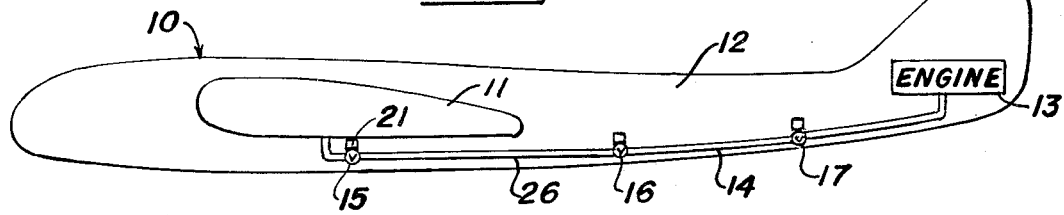
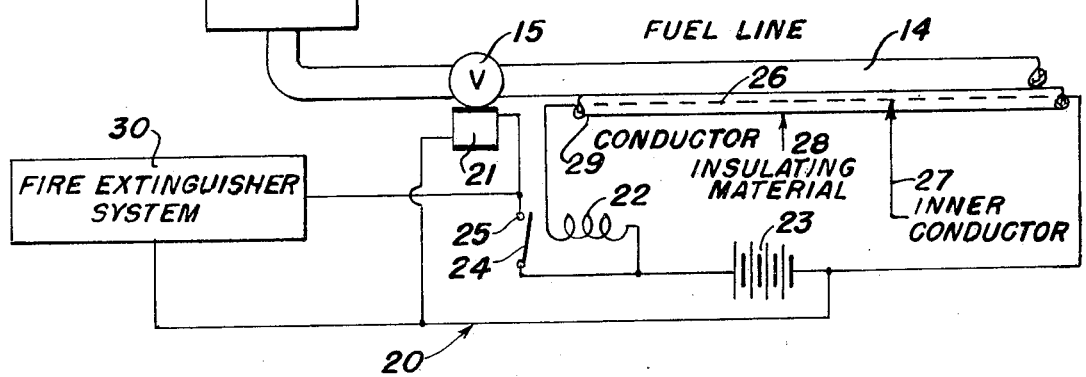
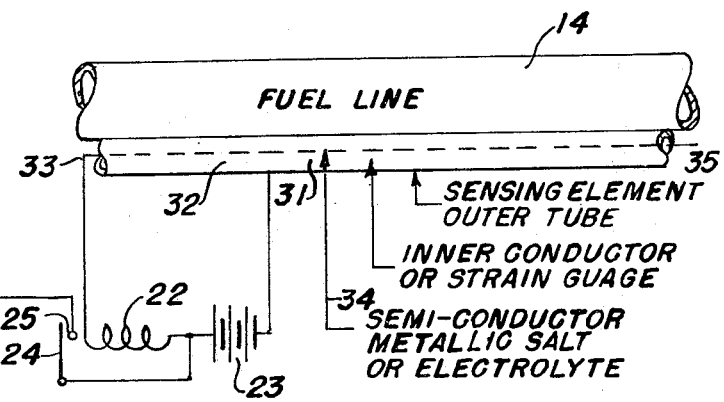
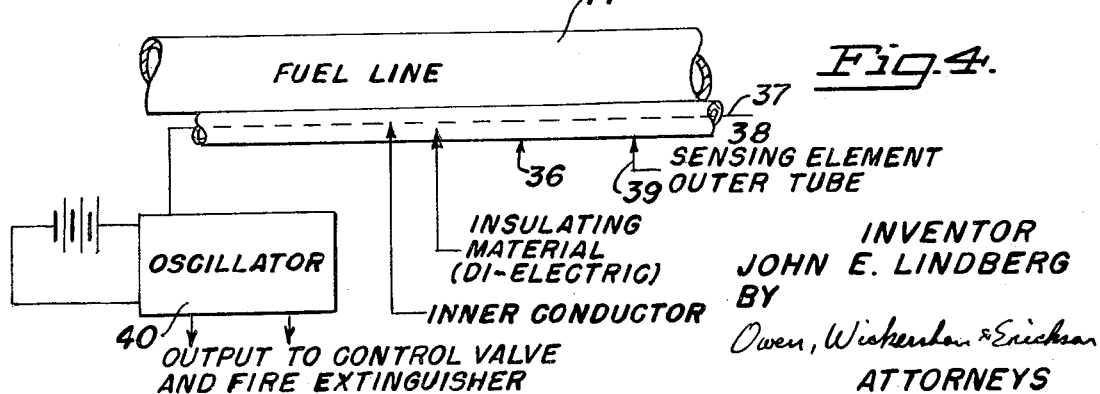
INVENTOR
JOHN E. LINDBERG
BY
Owen, Wickersham & Erickson
ATTORNEYS

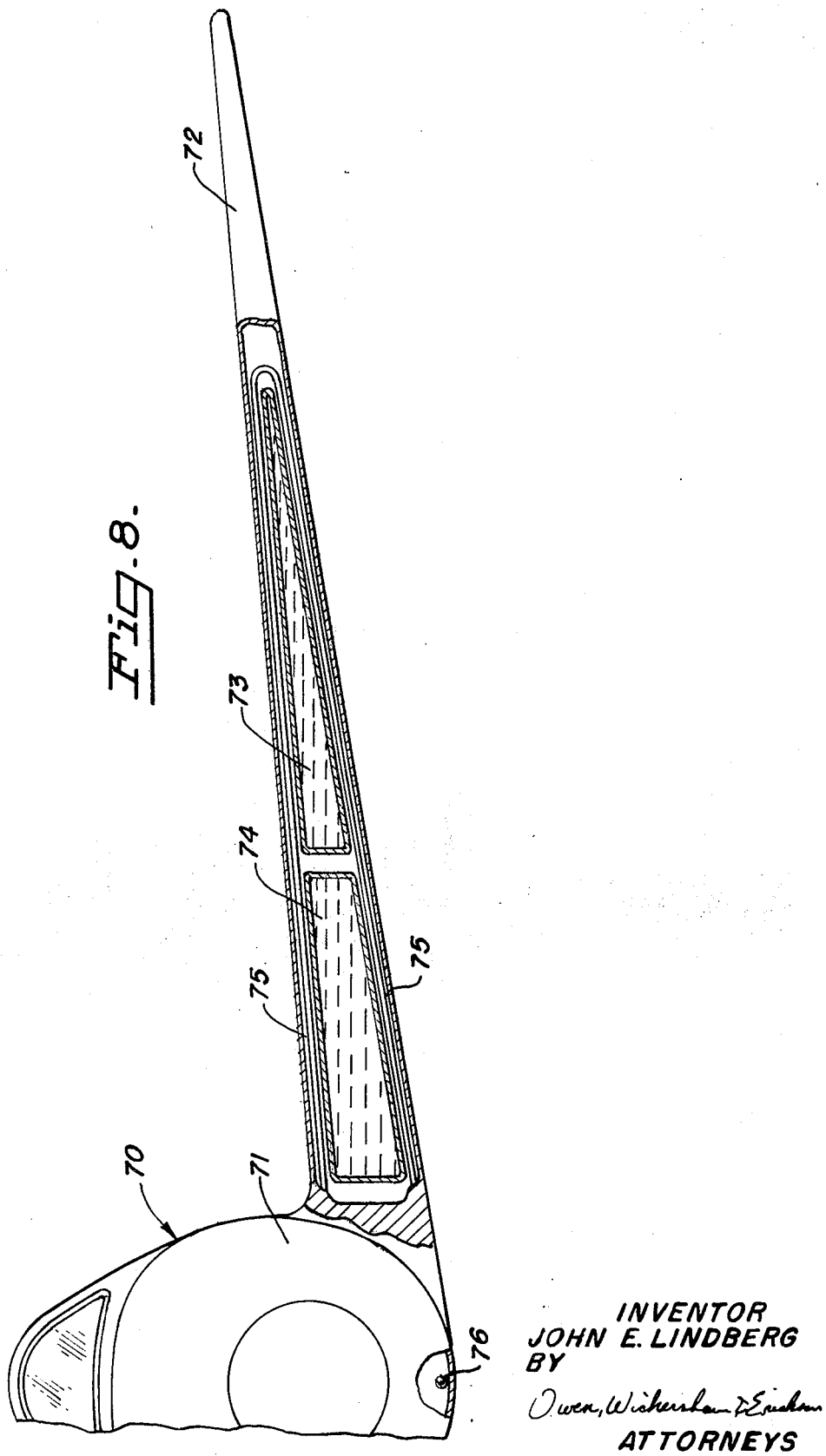

3,509,942
Patented May 5, 1970

3,509,942
SYSTEM FOR DETECTING STRUCTURAL FAILURE
John E. Lindberg, 1211 Upper Happy Valley Road,
Lafayette, Calif. 94549
Filed Aug. 15, 1966, Ser. No. 572,365
Int. Cl. A62c 35/12; F16k 17/36
U.S. Cl. 169—2      7 Claims

ABSTRACT OF THE DISCLOSURE

Shocks and stresses upon structure are detected by a sensor having an electrical conductor secured to the structure parallel to the longitudinal axis thereof. Excessive strain upon or breakage of the sensor opens an electrical circuit that then acts to produce remedial action.

---

This invention relates to the detection of structural weaknesses approaching or producing failure and to remedial actions for such failures. It also relates to an aircraft fire prevention system useful especially in connection with landing and takeoff accidents.

Structural failures become especially critical in aircraft, which will be used herein as exemplary of the application of the invention, for its examples are clear and are pressing. Some of these structural failures take place in crashes and emergency landings, such as rupture of the fuel lines, as discussed below, leading to very dangerous fires. Others may take place in flight, due to overstressing of various parts of the aircraft, including the wings and fuselage. For example, the wings may be overstressed in attempting to pull out from a power dive too abruptly.

An important object of the invention is to detect imminent structural failures before they occur and while there is still time for remedial action; in some cases the invention also includes the remedial action. In others, the remedy is inherently in the pilot's hands; for example, he can pull out from a dive less abruptly, and he will if he realizes how close the wings are to coming off.

Fire is one of the big dangers in crash landings, and otherwise successful emergency landings may be frustrated by fires caused by fracture of fuel lines or by other similar damage which, minor in itself, has major consequences.

For example, many commercial transport planes have one or two rear-mounted engines. Since the fuel is carried principally in the wings, long fuel lines are employed to convey the fuel from the wings through the fuselage to the engines at the rear. An accident on takeoff or on landing (which might be caused by failure of the landing gear or may result in such failure) may cause the fuselage to strike the ground with considerable force and at a substantial velocity. The ensuing forces may apply considerable stress to the fuel lines, fracturing them and releasing large quantities of their highly inflammable fluids, even draining the fuel storage tanks. The fluid may then be ignited, sometimes by sparks caused by the crash, sometimes by the engine ignition system, sometimes by other electrical equipment on the aircraft, and sometimes by careless or disobedient passengers who were smoking. This example illustrates the type of problem with which this invention is concerned and shows that there is a need for some way of shutting off the flow of the inflammable fluids through the fractured fuel lines, so that fire may be prevented or at least minimized instead of being fed. Remedial action also desirable.

Thus, further objects of this invention include the provision of a system wherein the high stresses tending to fracture fuel lines act to automatically cut off the flow of fuel through them, the provision of a system of automatic cutoff of flow of inflammable fluids when the fuselage is damaged by a crash, the provision of an automatic remedial system for crash-caused fires, and the provision of increased safety in aircraft.

Other objects and advantages of the invention will appear from the following description of some preferred embodiments thereof.

In the drawings:

FIG. 1 is a somewhat diagrammatic view in side elevation of an aircraft incorporating a system embodying the principles of the invention for detecting imminent fuel-line breakage and for then shutting off the fuel to the line.

FIG. 2 is a diagrammatic view of one form of the fuel-line safety system of the invention.

FIG. 3 is a diagrammatic view of a portion of another modified form of the invention applied to fuel-line safety.

FIG. 4 is a view similar to FIG. 3 of a portion of another modified form of the invention applied to fuel-line safety.

FIG. 8 is a fragmentary view in end elevation and partly in section of a portion of an aircraft showing a system for detecting structural overstressing in a wing and on the bottom of the fuselage.

Figure 5:
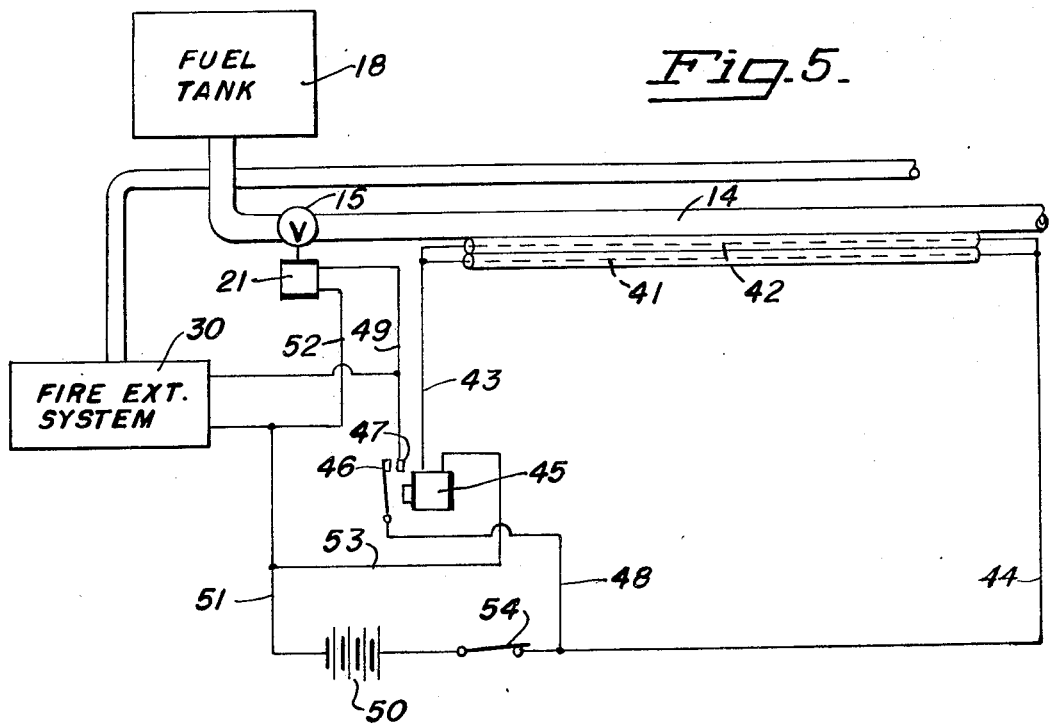
FIG. 5 is a diagrammatic view of a dual-integrity system for detection of imminent fuel-line breakage, according to the invention.

In FIG. 1, an aircraft 10 has a wing 11 in which fuel is stored, a fuselage 12, and a rear-mounted engine 13. A fuel line 14 leads from the wing 11 through the fuselage 12 to the engine 13. The invention provides a cutoff valve 15 closely adjacent the fuel tank (and there may also be other similar cutoff valves 16 and 17 at intervals along the line 14). The valve 15 (as well as the valves 16 and 17 when present) is normally open for the free flow of the fuel, but is controlled by a control circuit device 20 (FIG. 2), and when the control circuit 20 is actuated, the valve 15 is closed, as are the values 16 and 17 if they are present.

The control device 20 may act through a solenoid 21 which, when energized, closes the valve 15 (the valves 16 and 17 have such solenoids, too). Normally, the solenoid 21 is de-energized because a relay 22 is normally energized by a battery 23 to hold a switch 24 away from its contact 25. The circuit between the battery 23 and the relay 22 is, however, closed by a conducting sensor 26. The sensor 26 may comprise a conductor 27 contained inside an insulator 28, which is itself contained in a thin-walled metal tube 29. When the conductor 27 is severed, the relay 22 is de-energized and simultaneously the circuit to the solenoid 21 is closed, thereby closing the valve 15 (and the valves 16 and 17 if they are used), thereby cutting off the flow of fuel.

In the device of FIG. 2 the tube 29 may be secured to the outside along the belly of the fuselage 12, so that if the fuselage 12 is struck with great force, the tube 29 is broken. The tube 29 is made of material that will not fracture when submitted to the vibrations and shocks of normal operation but will fracture upon being submitted to any blow that would fracture the fuel lines 14. It may be a thin tube of stainless steel or other metal, preferably corrosion resistant. Moreover, being located where it will be struck sharply by the ground in a crash, the tube 29 and conductor 27 are broken before the line 14 can be broken. The conductor 27 may be a copper wire or other metal wire or may be a conductive nonmetal, such as carbon, or may be a metal salt or may be a semiconductor, or may be an electrolyte contained in the plastic or other nonconducting envelope 28.

In case of a mere power failure of the battery 23 on the airplane 10, the valve 15 will not be closed, because although the switch 24 will close against the contact 25, there will be no power to energize the solenoid 21.

In the FIG. 2 device, closure of the switch 24 against the contact 25 also sends power from the battery 23 to actuate a fire extinguishing system 30.

In the modification shown in FIG. 3, a sensor 32 which acts in the manner of a strain gauge is used. This sensor 32 does not have to be actually broken, for it detects abnormal stresses. It includes a conductor 33, which may be of resistance wire or a metallic salt or a semiconductor or a conductive liquid—all of the type where electrical resistance changes markedly when distorted or strained, or by stretching or bending, as well as when damaged or broken. The conductor 33 may be carried in a semiconductive or salt 34, which is in an outer tube 35. If broken, it works as did the FIG. 2 device, but even if not broken, it acts to de-energize the relay 22 if there is a substantial increase in resistance, in the manner of a strain gauge.

The FIG. 4 modification employs a sensor 36 utilizing the electrical capacitance between an inner conductor 37 and an outer conductor 38 with a dielectric 39 in between. Damage to the sensor causes a change in the capacitance, and the change is used to affect a capacitance measuring device, such as an impedance bridge, or to change the frequency of an oscillator 40 by affecting the capacitance of its circuit.

Preferably, the sensor 32, or 36, is a small diameter, lightweight member which may be secured to any structural member, including the fuel line or to the wing or to the fuselage frame or to any combination of structures.

Sometimes the use of a dual-integrity system may be desirable. In other words, there may be more than one sensor for each structural element where overstressing is to be detected. For example, such a system is shown in FIG. 5, with two sensors 41 and 42 in parallel with each other and connected to leads 43 and 44. The lead 43 is connected to a relay 45, which, when energized, closes a switch 46 against a contact 47. A lead 48 connects the lead 44 to the switch 46, while a lead 49 connects the contact 47 to the solenoid 21. A battery 50 is connected to the solenoid 21 by leads 51 and 52. The relay 45 is connected by a lead 53 to the leads 51 and 52, and the battery 50 is connected through a manual switch 54 to the lead 44. The relay 45 is normally energized; hence the solenoid 23 is normally de-energized. Since the sensors 41 and 42 are in parallel, both sensors 41 and 42 must break (or be overstrained) in order for the solenoid 21 act to close the valve 15.

Use of dual-integrity systems guards against accidental and unintended actuation of the valve 15, whether due to physical damage less than what is dangerous to the fuel line 14 or to other causes in which only one of the two sensors 41 and 42 should signal for any reason.

Any number of dual-integrity systems may be operated in parallel, all having to operate before there is actuation of the system. Conversely, either electrical or pneumatic or hydraulic systems may be assembled in series so that any *one* sensor will cause actuation. Series-parallel systems may similarly be used so that any one of the parallel systems will actuate the closure valve for the fuel line, with each parallel system having a plurality of devices in series.

Figure 6:
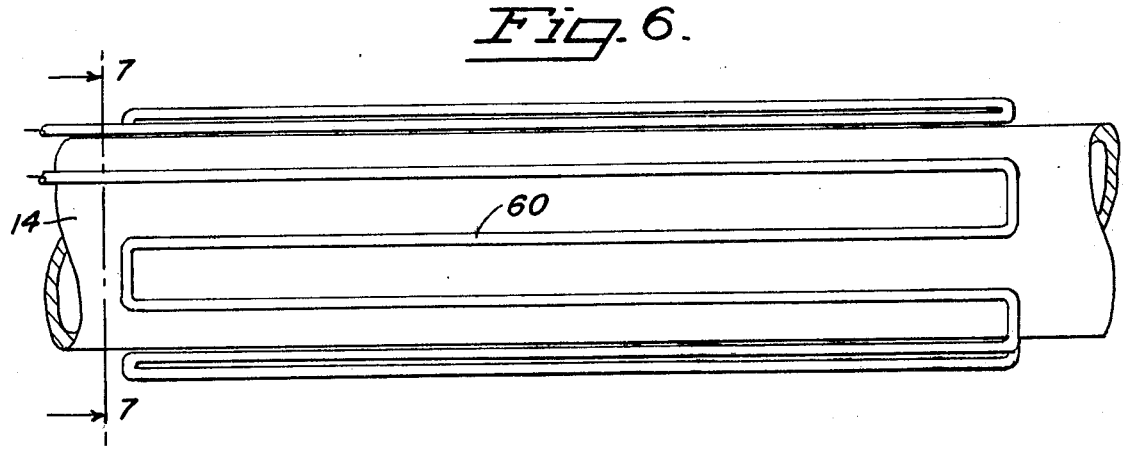
FIG. 6 is a view in elevation of a sensor system for guarding against breakages in many aspects.
Figure 7:
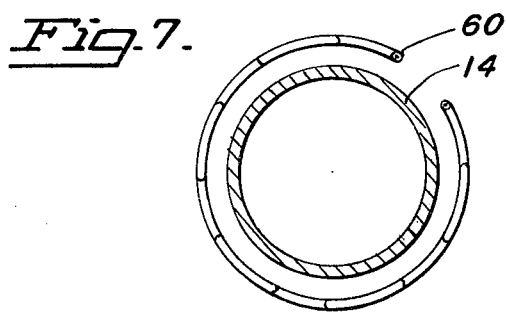
FIG. 7 is a view in section taken along the line 7—7 in FIG. 6.

FIGS. 6 and 7 show how a sensor 60 may be made to pass to-and-fro around a fuel line 14 to encircle the fuel line and thereby give protection from stresses and blows from all directions, not depending on the lower surface alone.

FIG. 8 shows an aircraft 70 with a fuselage 71 and a wing 72 having fuel tanks 73 and 74. A sensor 75 extends span-wise above and below the fuel tanks 73, 74, secured to a wing spar or other suitable structural member. The sensor 75 on at least one end enters the fuselage 71 where it is connected to a circuit like any of those of FIGS. 2, 3 or 4. Again, fuel line cutoff may be had if desired, but a warning device alone may be preferable here. Another sensor 76 may be used to detect fuselage overstressing. Suitable instrumentation may be employed for detecting the degree of overstressing if a strain-gauge sensor (FIG. 3) is used.

The operation shown is exemplary. To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An aircraft safety system for aircraft having a fuel storage tank connected by a fuel line to an engine, comprising
   a normally open shutoff valve in said fuel line located close to said storage tank,
   first electrically actuated means for closing said shutoff valve,
   a sensor including an electrical conducting means secured to said fuel line, for flexure therewith, along a path generally parallel to said fuel line, and
   second electrically actuated means actuated by a shock to said sensor of an intensity that is barely less than what can break the fuel line for actuating said first electrically actuated means to close said valve.

2. The system of claim 1 wherein said shutoff valve is a solenoid-actuated valve and said first electrically actuated means is the solenoid thereof.

3. The system of claim 2 wherein said second electrically actuated means includes a relay, a power source in series with said sensor conducting means and said relay for holding said relay energized until a said shock causes de-energization of said relay by affecting the ability of said conducting means to conduct, and switch means controlled by said relay for normally disconnecting said power source from said solenoid and, when said relay is de-energized, connecting said power source to said solenoid.

4. The system of claim 3 wherin there is also a fire extinguishing system actuated by movement of said relay switch.

5. The system of claim 3 having a plurality of said sensors in parallel with each other and in series with said second electrically actuated means.

6. The system of claim 3 wherein said sensor comprises strain gauge means that operates without itself breaking to detect shocks of predetermined intensity and to actuate said second electrically actuated means.

7. The system of claim 3 wherein said sensor operates by fracture of said electrical conducting means.

References Cited

UNITED STATES PATENTS

| | | | |
|---|---|---|---|
| 1,284,197 | 11/1918 | Larner et al. | 137—68 |
| 2,399,843 | 5/1946 | Adams | 137—67 XR |
| 2,413,087 | 12/1946 | Urbany | 137—312 XR |
| 2,531,958 | 11/1950 | Williams et al. | 137—68 |
| 2,638,286 | 5/1953 | Mathisen | 244—1 |
| 192,909 | 7/1877 | Forbes | 340—421 X |
| 3,338,091 | 8/1967 | Tatum | 73—88.5 |

WILLIAM F. O'DEA, Primary Examiner

R. GERARD, Assistant Examiner

U.S. Cl. X.R.

73—88.5; 137—67; 222—52; 244—129, 135; 340—27, 256, 419, 421